US006718823B2

(12) United States Patent
Platt

(10) Patent No.: US 6,718,823 B2
(45) Date of Patent: Apr. 13, 2004

(54) PULSE WIDTH MODULATION DRIVE SIGNAL FOR A MEMS GYROSCOPE

(75) Inventor: William Platt, Columbia Heights, MN (US)

(73) Assignee: Honeywell International Inc., Morristown, NJ (US)

( * ) Notice: Subject to any disclaimer, the term of this patent is extended or adjusted under 35 U.S.C. 154(b) by 36 days.

(21) Appl. No.: 10/137,170

(22) Filed: Apr. 30, 2002

(65) Prior Publication Data
US 2003/0200803 A1 Oct. 30, 2003

(51) Int. Cl.[7] .................................................. G01P 9/04
(52) U.S. Cl. .................................. 73/504.12; 73/504.02
(58) Field of Search ......................... 73/504.16, 504.02, 73/504.04, 504.12, 504.13, 504.14, 504.15, 514.16, 514.32; 310/370

(56) References Cited

U.S. PATENT DOCUMENTS

| 5,198,663 | A | * | 3/1993 | Ichikawa et al. | ......... 250/231.1 |
| 5,225,889 | A | * | 7/1993 | Fritze et al. | ................. 356/476 |
| 5,241,861 | A | | 9/1993 | Hulsing, II | |
| 5,341,209 | A | * | 8/1994 | Karpinski | .................... 356/475 |
| 5,438,410 | A | | 8/1995 | Killpatrick et al. | |
| 5,488,862 | A | | 2/1996 | Neukermans et al. | |
| 5,635,638 | A | | 6/1997 | Geen | |
| 5,756,895 | A | | 5/1998 | Kubena et al. | |
| 5,806,364 | A | | 9/1998 | Kato et al. | |
| 5,831,164 | A | * | 11/1998 | Reddi et al. | ............. 73/514.01 |
| 5,872,313 | A | | 2/1999 | Zarabadi et al. | |
| 5,911,156 | A | * | 6/1999 | Ward et al. | ............... 73/504.16 |
| 5,987,986 | A | | 11/1999 | Wyse et al. | |
| 6,109,105 | A | | 8/2000 | Kubena et al. | |
| 6,122,961 | A | | 9/2000 | Geen et al. | |
| 6,267,008 | B1 | | 7/2001 | Nagao | |
| 6,272,925 | B1 | | 8/2001 | Watson | |
| 6,311,555 | B1 | | 11/2001 | McCall et al. | |
| 6,374,671 | B1 | | 4/2002 | Ryrko et al. | |

FOREIGN PATENT DOCUMENTS

| EP | 0 664 438 A1 | 7/1995 |
| WO | WO 96/39614 | 12/1996 |
| WO | WO 00/57194 | 9/2000 |

OTHER PUBLICATIONS

White, Robert D., "Effects of Impact and Vibration on the Performance of a Micromachined Tuning Fork Gyroscope," Thesis, Massachusetts Institute of Technology, Jun. 1999, pp. 1–55.
"Overview—Electronics for Coriolis Force and Other Sensors/Patent No. 5481914, Issued Jan. 9, 1996," date unknown, pp. 1–2.
Shakouri, Ali, based on the notes by Petersen, Stephen, University of California, Santa Cruz, Electrical Engineering Department, Analog Electronics Laboratory, date unknown, pp. 1–4.
"Switching Time of a Diode," http://www.csee.umbc.edu/~plusquel/v1sill/slides/diode3.html, Jan. 24, 2002, pp. 1–12.
Mac Pamphlet 55–34 SKE/ZM Air Delivery System (AN/APN–169C and AN/TPN–27A), Operator's Guide, HQ Master Reference Library.
International Search Report For Application No. PCT/US 03/13422, dated Aug.. 21, 2003.

* cited by examiner

*Primary Examiner*—Helen C. Kwok
(74) *Attorney, Agent, or Firm*—McDonnell Boehnen Hulbert & Berghoff

(57) ABSTRACT

A MEMS gyroscope may be coupled to drive electronics that provide a pulse width modulation drive signal to the MEMS gyroscope. The pulse width modulation drive signal may be generated by comparing a pickoff signal and/or input signal to a direct current threshold level.

28 Claims, 4 Drawing Sheets

PULSE WIDTH MODULATION DRIVE SIGNAL FOR A MEMS GYROSCOPE

FIELD

The present invention relates generally to MEMS gyroscopes, and more particularly, relates to utilizing a pulse width modulation drive signal for MEMS gyroscopes.

BACKGROUND

Microelectromechanical systems (MEMS) have the potential to transform a number of different industries in modern society. Ranging from aerospace to bioengineering, the impact of MEMS is likely to be as profound and pervasive as that of integrated circuits. In particular, the use of MEMS devices as sensors and actuators in electromechanical systems is very promising. By creating electrical and mechanical components on a silicon substrate using standard microfabrication techniques, MEMS technology enables relatively small, cheap, and accurate sensing devices to be created. MEMS sensors and actuators are already being used in numerous commercial devices, including automobile airbag accelerometers and vibration sensors.

A common application of MEMS sensors has also been in the use of gyroscopes, which may use the motion of a vibrating element to measure an angular rate of rotation. A variety of MEMS gyroscopes are commercially available, including tuning fork gyroscopes and angular rate sensing gyroscopes. In the case of tuning fork gyroscopes, three orthogonal axes (drive, input, and sense) may be utilized for describing gyroscope motion. When a tuning fork gyroscope is in operation, a vibrating element may be placed in oscillatory motion along the direction of the drive axis while the gyroscope rotates about the input axis. These motions may result in a Coriolis acceleration that can be measured along the direction of the sense axis. Using a well-known mathematical relationship, the angular rate of rotation of the gyroscope about the input axis may then be calculated.

Despite the advantages of MEMS technology, prior art MEMS gyroscopes often face a number of drawbacks. In prior art systems, amplitude modulated drive signals are often used for creating the oscillatory motion of the vibrating elements. Such drive signals may be susceptible to external interference and may become distorted during transmission. Additionally, complicated circuitry (e.g., complex Automatic Gain Control (AGC) loops and analog multiplier circuits) may be required for creating and maintaining such drive signals.

Accordingly, it is desirable to have a drive signal for a MEMS gyroscope that overcomes the above deficiencies associated with the prior art. This may be achieved by utilizing a pulse width modulation drive signal for improved performance of a MEMS gyroscope.

SUMMARY

A system and method for measuring the rate of rotation of a MEMS gyroscope is provided. In an exemplary embodiment, a MEMS gyroscope may be coupled to drive electronics operable to provide a pulse width modulation drive signal to the MEMS gyroscope.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
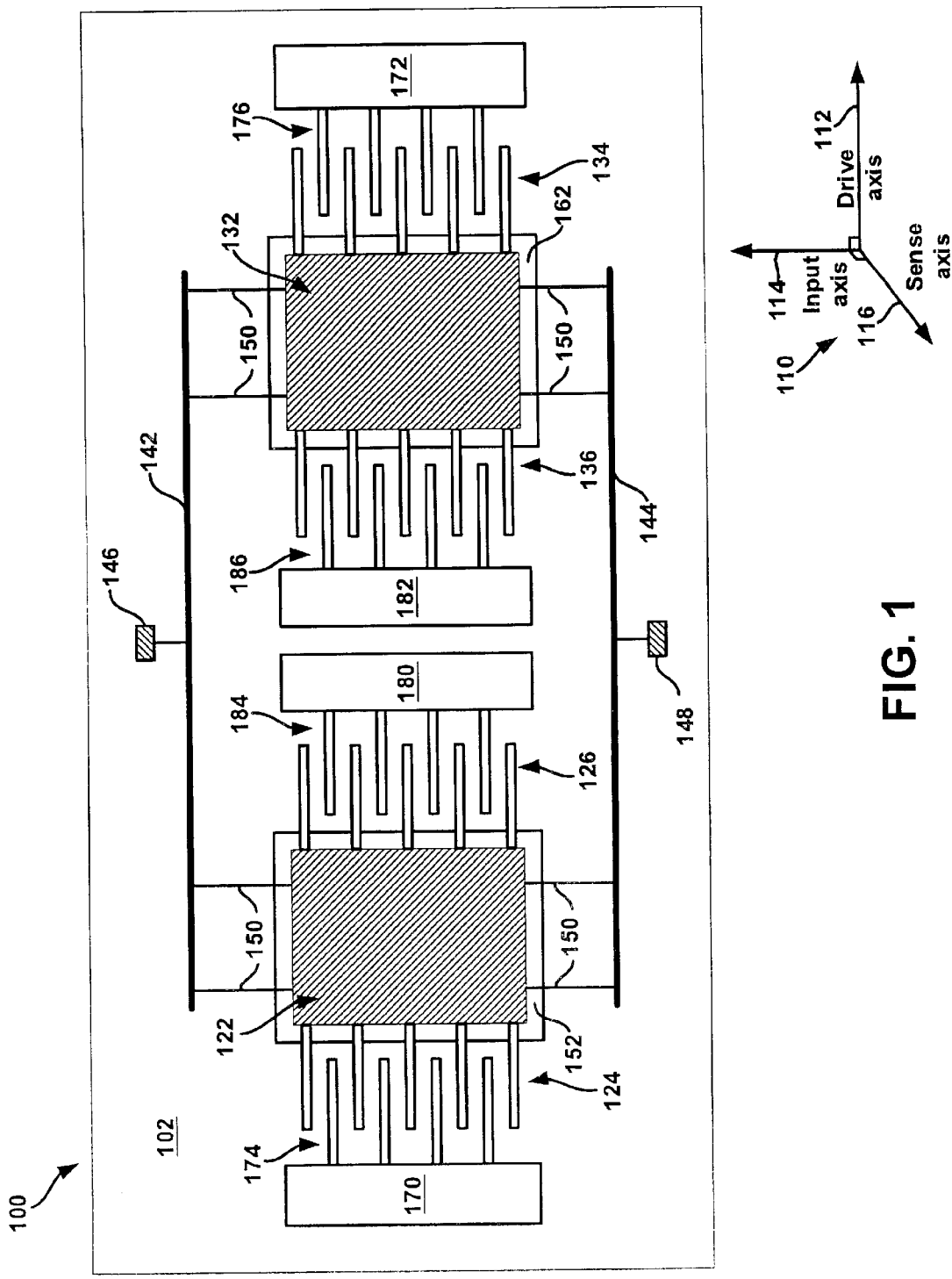
FIG. 1 illustrates a plan view of an exemplary MEMS gyroscope.

Referring to FIG. 1, an exemplary plan view of a MEMS gyroscope 100 is shown. In the present embodiment, the MEMS gyroscope 100 is a tuning fork gyroscope, but it should be understood that other types of MEMS gyroscopes (e.g., angular rate sensing gyroscopes) or MEMS sensors may also be utilized. The exemplary MEMS gyroscope 100 includes a substrate 102 from which the other components of the gyroscope 100 may be micromachined. The substrate 102 may be silicon or any other material known in the art usable in micromachining processes, such as gallium arsenide, glass, or other materials common to the integrated circuit process. Also shown in FIG. 1 are a set of orthogonal axes 110 that may be used to describe the motion of the gyroscope 100 and its components. Preferably, a drive axis 112 and input axis 114 are parallel to the surface of the substrate 102, and a sense axis 116 is perpendicular to the surface of the substrate 102. Additionally, the exemplary gyroscope 100 may include a first proof mass 122 and a second proof mass 132, hereinafter collectively referred to as "proof masses 122, 132"; cross beams 142, 144; anchors 146, 148; a plurality of support beams 150; a first sense plate 152 and a second sense plate 162, hereinafter collectively referred to as "sense plates 152, 162"; a first motor drive comb 170 and a second motor drive comb 172, hereinafter collectively referred to as "motor drive combs 170, 172"; and a first motor pickoff comb 180 and a second motor pickoff comb 182, hereinafter collectively referred to as "motor pickoff combs 180, 182".

In the present embodiment, the proof masses 122, 132 may be connected to the cross beams 142, 144 by the plurality of support beams 150. The proof masses 122, 132 may be silicon plates or any other type of material suitable for use in a MEMS gyroscope system. Although not shown, the proof masses 122, 132 may contain holes (e.g., square openings) through which a fluid or gas (e.g., air) may pass, which may help reduce thin film damping effects. As will be described below, the movement of the proof masses 122, 132 may be utilized to detect the rotation of the gyroscope 100 along the input axis 114.

In addition, the first proof mass 122 may have first proof mass electrodes 124, 126 that extend towards the first motor drive comb 170 and first motor pickoff comb 180, respectively. Similarly, the second proof mass 132 may have second proof mass electrodes 134, 136 that extend towards the second motor drive comb 172 and second motor pickoff comb 182, respectively. The first proof mass electrodes 124, 126 and second proof mass electrodes 134, 136 hereinafter may be collectively referred to as "proof mass electrodes 124, 126, 134, 136". The proof mass electrodes 124, 136, 134, 136 may be any conductive or semiconductive material that may be utilized to create an electrical contact, and may be micromachined directly out of the silicon substrate 102. Further, it should be understood that any number of electrodes may be utilized with the proof mass electrodes 124, 126, 134, 136.

FIG. 1 also shows cross beams 142, 144 connected to the substrate 102 by anchors 146, 148, respectively. The cross beams 142, 144 may be rigid rods that have been micromachined out of the substrate 102 using standard microfabrication processes (e.g., photolithography, chemical etching, etc.). The anchors 146, 148 may connect the cross beams 142, 144 to the substrate 102.

Similar to the cross beams 142, 144 and proof masses 122, 132, the plurality of support beams 150 may be micromachined from the substrate 102. The plurality of support beams 150 may act as springs that enable the proof masses 122, 132 to oscillate along the direction of the drive axis 112. The spring-like nature of the plurality of support beams 150 may also enable the proof masses 122, 132 to move along the direction of the sense axis 116. Thus, depending on the motion of the gyroscope 100, the distance between the proof masses 122, 132 and the substrate 102 may vary. It should be understood that although eight support beams 150 are shown in the present embodiment, any number of support beams may be utilized.

The gyroscope 100 may also include sense plates 152, 162 located substantially underneath the proof masses 122, 132, respectively, on the surface of the substrate 102. In the present embodiment, the sense plates 152, 162 are silicon plates micromachined out of the substrate 102. Alternatively, the sense plates 152, 162 may be any conductive or semi-conductive material known in the art. Preferably, the sense plates 152, 162 operate as capacitors with the proof masses 122, 132, respectively. As described later, changes in capacitance between the sense plates 152, 162 and proof masses 122, 132 may be utilized for detecting the Coriolis acceleration of the proof masses 122, 132 along the sense axis 116. The Coriolis acceleration may in turn be utilized to calculate a rate of rotation for the gyroscope 100 about the input axis 114.

Further, as shown in FIG. 1, the gyroscope 100 also includes motor drive combs 170, 172 having a plurality of interdigitated drive comb electrodes 174, 176, respectively. In the present embodiment, the plurality of interdigitated drive comb electrodes 174, 176 may form capacitors with the first proof mass electrode 124 and second proof mass electrode 134, respectively. Any number of electrodes may be utilized for the drive comb electrodes 174, 176.

As described later, the motor drive combs 170, 172 may also be connected to drive electronics (not shown in FIG. 1). The drive electronics may provide one or more drive signals to the motor drive combs 170, 172 which may be operable to and cause the proof masses 122, 132 to oscillate along the drive axis 112. In the present embodiment, both motor drive combs 170, 172 may receive a drive signal at the same frequency.

However, these drive signals may be out of phase (e.g., by one hundred and eighty (180) degrees). Further, the drive signals may be pulse width modulation (PWM) signals in the present embodiment.

Turning now to another component within the gyroscope 100, the motor pickoff combs 180, 182 may have a plurality of interdigitated pickoff comb electrodes 184, 186, respectively. In the present embodiment, the plurality of interdigitated pickoff comb electrodes 184, 186 may form capacitors with the first proof mass electrode 126 and second proof mass electrode 136, respectively. The motor pickoff combs 180, 182 may detect a pickoff signal (e.g., current) that is induced by changes in the capacitance between the pickoff comb electrodes 184, 186 and the first proof mass electrode 126 and second proof mass electrode 136, respectively. The pickoff signal may be subsequently utilized for determining the motion and velocity of the proof masses 122, 132. Additionally, the pickoff signal may be transferred from the motor pickoff combs 180, 182 to the drive electronics as part of a feedback loop. In an exemplary embodiment, the pickoff signal may be used by the drive electronics for determining whether the proof masses 122, 132 are oscillating at the proper frequency (e.g., tuning fork frequency), amplitude, and phase. The drive electronics may then change characteristics of the drive signal (e.g., pulse width and/or phase) if the motion of the proof masses 122, 132 should be altered.

It should be understood that any number of the previously described elements may be utilized with the present embodiment, depending on their desired functionality. For example, in alternate embodiments, any number of drive comb electrodes 174, 176, pickoff comb electrodes 184, 186, motor drive combs 170, 172 and/or motor pickoff combs 180, 182 may be utilized. Additionally, the components of the gyroscope 100 may be created from different materials and connected separately to the substrate 102 rather than being micromachined from the substrate 102, and more or fewer components may be utilized for the gyroscope 100 than described in the present embodiment.

Having described the structure and connectivity of the gyroscope 100, a brief explanation may illustrate how the gyroscope 100 functions. In the present embodiment, the MEMS gyroscope 100 is capable of measuring the rate of rotation about the input axis 114. When functioning, the proof masses 122, 132 of the gyroscope 100 are driven by a drive signal at the tuning fork frequency. In the present embodiment, the drive signal may be a PWM drive signal, which may cause the proof masses 122, 132 to oscillate along the direction of the drive axis 112. While the proof masses 122, 132 are oscillating, the gyroscope 100 may be rotated about the input axis 114. As known in the art, an oscillating element may undergo a Coriolis acceleration when it is rotated about an axis orthogonal to the direction of its oscillation.

Therefore, the movement of the gyroscope 100 may result in a Coriolis acceleration along the direction of the sense axis 116, causing the distance and capacitance between the proof masses 122, 132 and the sense plates 152, 162 to vary. Through this change in capacitance, the Coriolis acceleration of the proof masses 122, 132 may be calculated. The following cross-product relationship may then be utilized to calculate the angular rate of rotation of the gyroscope 100:

$$A_{Coriolis} = 2\Omega \times v,$$

where $A_{Coriolis}$=resulting Coriolis acceleration along the sense axis 116, $\Omega$=rate of rotation of the gyroscope 100 about the input axis 114, and v=drive velocity of the proof masses 122, 132 along the drive axis 112. The drive velocity of the proof masses 122, 132 may be determined from a pickoff signal obtained from the motor pickoff combs 180, 182. The drive velocity and the measured Coriolis acceleration may then be utilized to determine the rate of rotation of the gyroscope 100.

Figure 2:
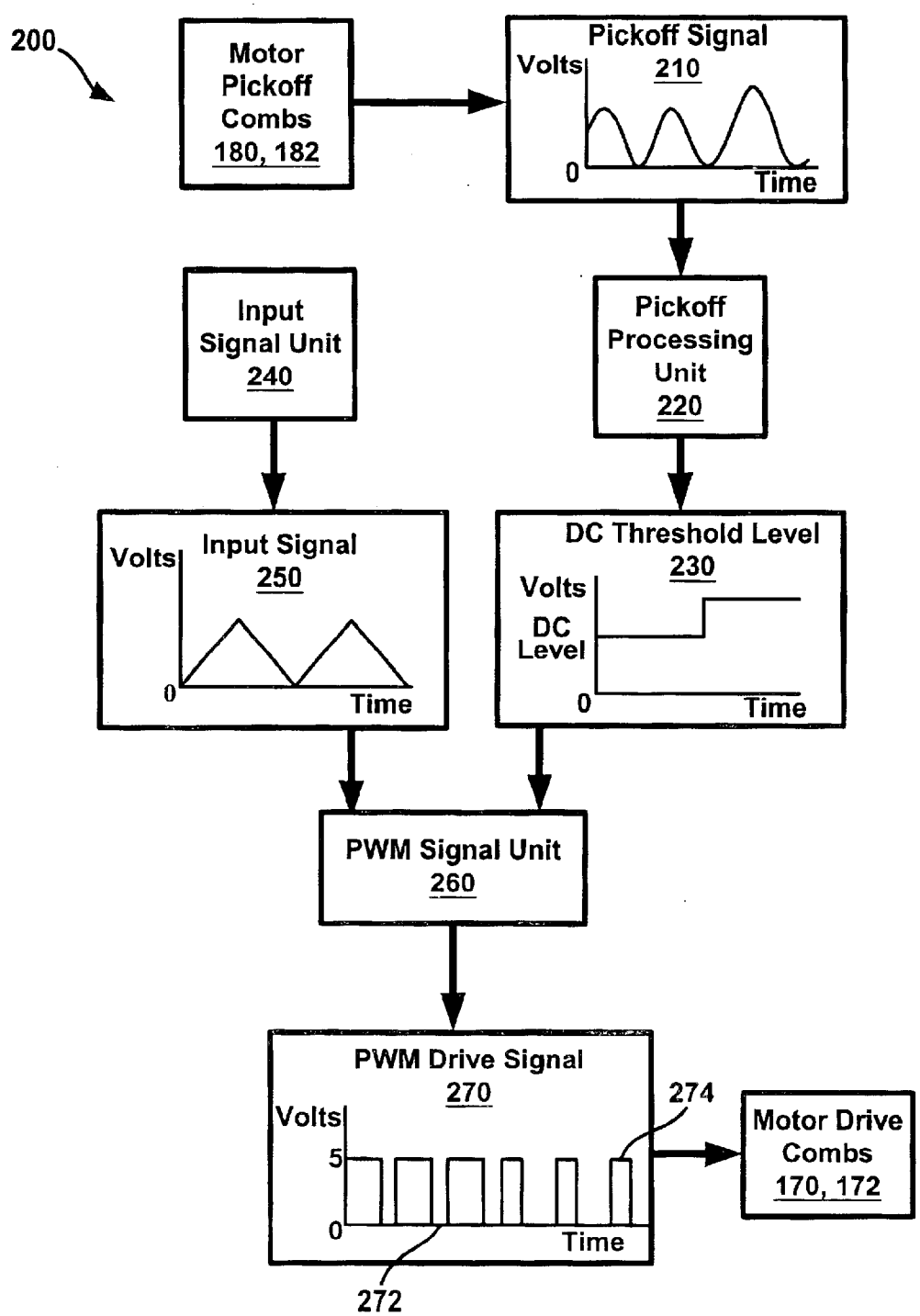
FIG. 2 illustrates a simplified data flow diagram of drive electronics operable to provide a pulse width modulation (PWM) drive signal for use with the MEMS gyroscope of FIG. 1, according to an exemplary embodiment.

Turning now to FIG. 2, a simplified data flow diagram illustrates drive electronics 200 for use with the gyroscope 100. In the present embodiment, the drive electronics 200 may include a pickoff processing unit 220 and input signal unit 240 in communication with a PWM signal unit 260.

Each of these units 220, 240, 260 may include any number of standard circuit elements, such as operational amplifiers, filters, diodes, capacitors, inductors, and resistors, and the connections between these elements may vary depending on their desired functionality.

In the present embodiment, the motor pickoff combs 180, 182 may send a pickoff signal 210 to the pickoff processing unit 220. The pickoff signal 210 may be a current induced by changes in capacitance between the proof mass electrodes 124, 126, 134, 136, and the pickoff comb electrodes 184, 186. Although shown as an oscillating wave in FIG. 2, it should be understood that the pickoff signal 210 may take any shape. Further, the pickoff signal 210 may be amplified, demodulated, and/or filtered once received by the pickoff processing unit 220 in order to create a direct current (DC) threshold level 230. In the present embodiment, the voltage level of the DC threshold level 230 may reflect an average magnitude (e.g., voltage) of the pickoff signal 210. Thus, as shown in FIG. 2, if the average magnitude of the pickoff signal 210 increases, the value of the DC threshold level 230 may also increase.

The input signal unit 240 may be any type of oscillator or signal generating unit that is operable to provide an input signal 250. In the present embodiment, the input signal 250 is a triangle waveform, but any type of waveform that may be utilized for creating PWM signals may also be used. For example, the input signal 250 may be any type of periodic waveform.

The DC threshold level 230 and the input signal 250 may be both sent to the PWM signal unit 260. Any number of the units 220, 240, 260 within the drive electronics 200 may be located on a PWM chip.

In the present embodiment, the PWM signal unit 260 may compare the input signal 250 to the DC threshold level 230 in order to create a PWM drive signal 270. The PWM drive signal 270 may have a plurality of levels, such as a low level 272 and a high level 274. In the present embodiment, the low level 272 may be substantially zero (0) volts and the high level 274 may be five (5) volts, but it should be understood that other values may be used.

The pulse width of the PWM drive signal 270 and the relative amount of time at each level 272, 274 may depend on the relative magnitudes of the DC threshold level 230 and the input signal 250. For example, at times when the input signal 250 has a lower voltage than the DC threshold level 230, the PWM drive signal 270 may be set at the low level 272. At times when the input signal 250 has a higher voltage than the DC threshold level 230, the PWM drive signal 270 may be set at the high level 274. Thus, the PWM drive signal 270 may change levels when the input signal 250 crosses the DC threshold level 230. The PWM signal unit 260 may then provide the PWM drive signal 270 to the motor drive combs 170, 172 to drive the proof masses 122, 132.

Although only one PWM drive signal 270 is shown in FIG. 2, it should be understood that multiple PWM drive signals that differ in phase may alternatively be utilized. For example, the PWM signal unit 270 may provide two PWM drive signals that are one hundred and eighty (180) degrees out of phase. One of these signals may be sent to the first motor drive comb 170, and the other signal may be sent to the second motor drive comb 172. Alternatively, the drive electronics 200 may include a phase shifter that is operable to convert the PWM drive signal 270 into two PWM drive signals that are out of phase, or the PWM drive signal 270 may be inverted. Furthermore, although each of the signals 210, 230, 250, 270 is preferably transmitted along standard copper wire traces, other means of transmission (e.g., wireless communication) may also be utilized. It should also be understood that in an alternate embodiment, the PWM drive signal 270 may have a low level 272 when the input signal 250 has a voltage higher than the DC threshold level 230, and a high level 274 when the input signal 250 has a voltage lower than the DC threshold level 230. Furthermore, when the pick off signal 210 is too low (e.g., representing an inadequate drive amplitude), the DC threshold level 230 may be changed so that the PWM drive signal 270 stays at the high level 274 for a longer duration. Similarly, if the pick off signal 210 is too high (e.g., representing an excessive drive amplitude), the DC threshold level 230 may be changed so that the PWM drive signal 270 stays at the low level 272 for a longer duration.

Figure 3:
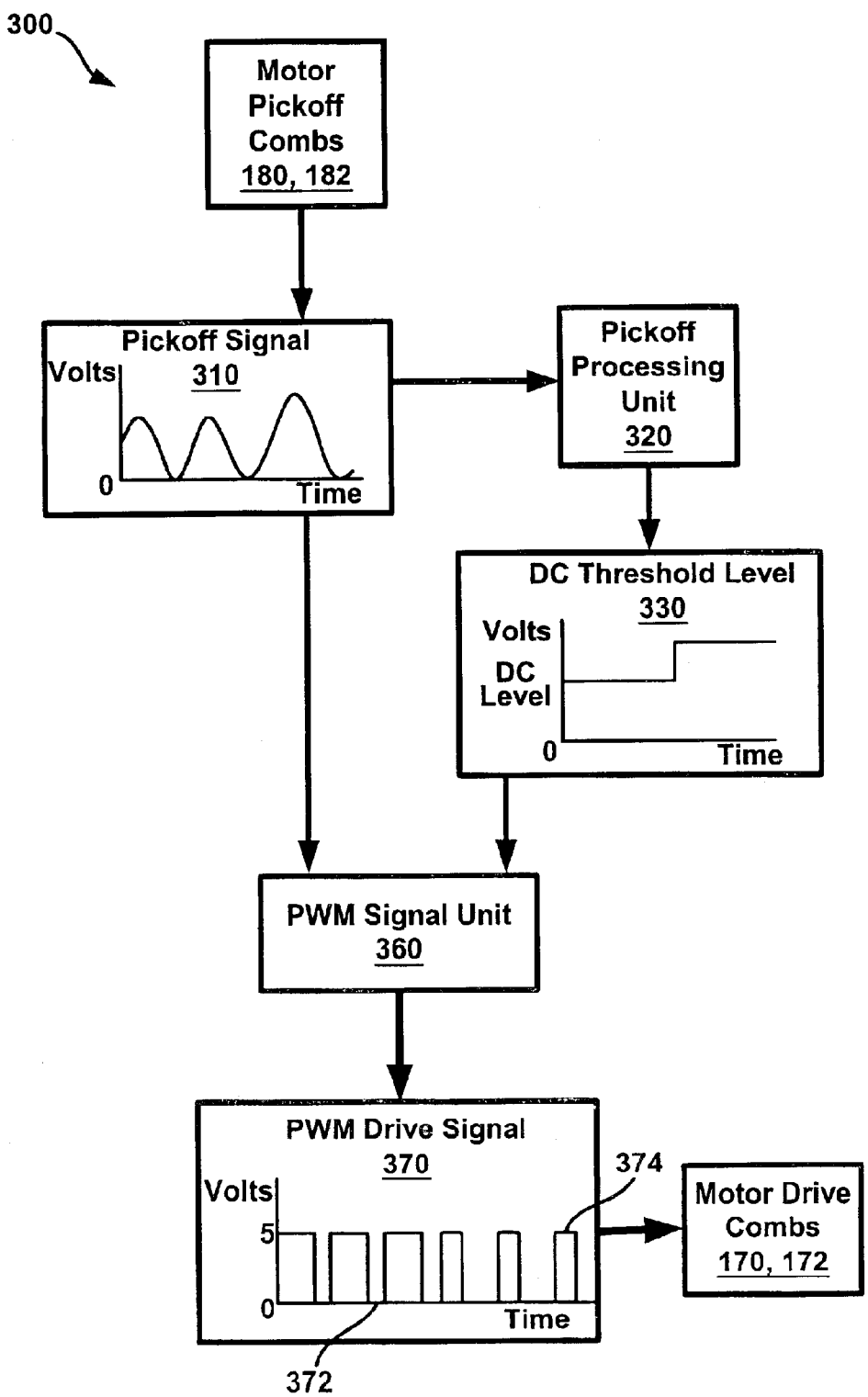
FIG. 3 illustrates a simplified data flow diagram of drive electronics operable to provide a PWM drive signal for use with the MEMS gyroscope of FIG. 1, according to another exemplary embodiment.

Turning now to FIG. 3, a simplified data flow diagram illustrates another drive electronics 300 for use with the gyroscope 100. Preferably, components 320 and 360 are substantially the same as components 220 and 260, respectively. Similarly, all of the signals 310, 330, and 370 may be substantially the same as signals 210, 230, and 270, respectively. The DC threshold level 330 may be determined as before from the pickoff signal 310 in the pickoff processing unit 320. However, in the present embodiment, the pickoff signal 310 may be provided to the PWM signal unit 360 and directly compared to the DC threshold level 330.

As in the previous embodiment, the relative amount of time the PWM drive signal 370 spends at each level 372, 374 may depend on the relative magnitudes of the pickoff signal 310 and the DC threshold level 330. For example, at times when the pickoff signal 310 has a lower voltage than the DC threshold level 330, the PWM drive signal 370 may be set at the low level 372. Alternatively, at times when the pickoff signal 310 has a higher voltage than the DC threshold level 330, the PWM drive signal 370 may be set at the high level 374. Similar to the previous embodiment, the PWM drive signal 370 may be inverted, converted into two out-of-phase PWM drive signals, and/or sent to the motor drive combs 170, 172 for driving the proof masses 122, 132.

Figure 4:
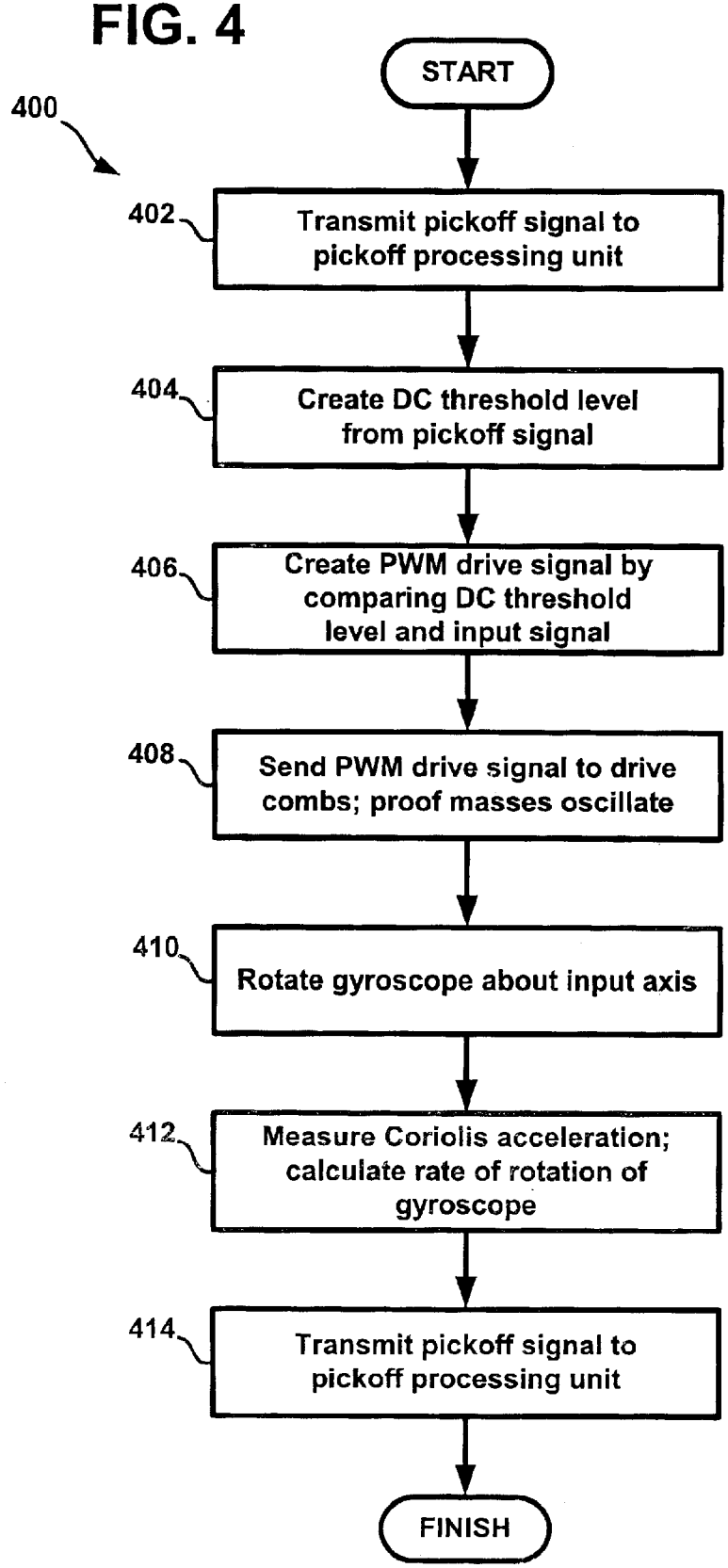
FIG. 4 is a flow chart of a method of measuring the rate of rotation of the MEMS gyroscope of FIG. 1, according to an exemplary embodiment.

Turning now to FIG. 4, a method 400 of detecting a rate of rotation of the gyroscope 100 is shown. The present embodiment utilizes the drive electronics 200 shown in FIG. 2, but it should be understood that alternatively, the drive electronics 300 from FIG. 3 or any other embodiment may be utilized. In the exemplary method 400, the gyroscope 100 measures its rate of rotation about the input axis 114. Preferably, the gyroscope 100 is coupled to another functional device having the same rotation, so that the gyroscope 100 may measure the rotation of that device.

The method 400 begins with step 402, in which the pickoff signal 210 is transmitted from the motor pickoff combs 180, 182 of the MEMS gyroscope 100 to the pickoff processing unit 220. The pickoff signal 210 may be produced by a change in capacitance between the pickoff comb electrodes 184, 186 and the first proof mass electrode 126 and second proof mass electrode 136, respectively.

In step 404, the pickoff processing unit 220 may create the DC threshold level 230 from the pickoff signal 210. This may be accomplished by amplifying, demodulating, and/or filtering the pickoff signal 210.

In step 406, the DC threshold level 230 generated by the pickoff processing unit 220 and the input signal 250 generated by the input signal unit 240 may be transmitted to the PWM signal unit 260. A PWM drive signal 270 may then be created by comparing the DC threshold level 230 and the input signal 250. In the present method 400, the PWM drive signal 270 may have a low level 272 when the input signal 250 has a voltage below the DC threshold level 230, and a high level 274 when the input signal 250 has a voltage higher than the DC threshold level 230. In an alternate embodiment, the pickoff signal 210 may be directly compared to the DC threshold level 230 in order to determine the PWM drive signal 270.

In step 408, the PWM drive signal 270 may be sent to the motor drive combs 170, 172 of the MEMS gyroscope 100. The proof masses 122, 132 may oscillate at a tuning fork frequency along the drive axis 112 in response to the PWM drive signal 270.

In step 410, the gyroscope 100 may rotate about the input axis 114. The rotation about the input axis, along with the oscillation of the proof masses 122, 132 along the drive axis 112, may induce a Coriolis acceleration along the sense axis 116.

In step 412, the Coriolis acceleration may be measured through the change in capacitance between the proof masses 122, 132 and the sense plates 152, 162, respectively. The Coriolis acceleration may subsequently be utilized to calculate the rate of rotation of the gyroscope 100.

Step 414 is preferably similar to step 402. A pickoff signal 210 (e.g., current) may be induced within the motor pickoff combs 180, 182 and used to calculate a frequency and a velocity of the proof masses 122, 132. Additionally, the pickoff signal 210 may be transmitted to the pickoff processing unit 220 within the drive electronics 200, forming a feedback loop. The drive electronics 200 may subsequently utilize the pickoff signal 210 to alter characteristics (e.g., pulse width and phase) of the PWM drive signal 270.

The exemplary embodiments presented here may have numerous advantages. By utilizing the PWM drive signal 270 (or 370) for oscillating the proof masses 122, 132, complicated analog circuitry may not be needed. Additionally, the inherent digital nature of PWM signals enables them to be controlled more precisely and at lower cost. Further, PWM signal may be less susceptible to distortion and may maintain higher signal quality. The exemplary embodiments disclosed here may also be implemented at minimal additional cost using relatively simple PWM circuitry.

It should be understood that a wide variety of additions and modifications may be made to the exemplary embodiments described within the present application. For example, a number of MEMS gyroscopes may be used in combination in order to measure the rotation of a device along a number of different axes. In addition, any type of MEMS gyroscope and/or MEMS sensor may be utilized with the present embodiments. Additionally, a variety of different materials may be used for the components of the gyroscope 100 depending on their desired functionality. Furthermore, any number of embodiments within the present application may be combined, depending on consumer and/or manufacturing preferences. Also, in alternate embodiments, only one motor pickoff comb may be utilized, or the positions of the motor drive combs 170, 172 and motor pickoff combs 180, 182 may be switched. It is therefore intended that the foregoing description illustrates rather than limits this invention and that it is the following claims, including all equivalents, which define this invention:

What is claimed is:

1. A system for measuring a rate of rotation of a microelectromechanical system (MEMS) gyroscope comprising in combination:
   the MEMS gyroscope for measuring a rate of rotation, the MEMS gyroscope generating a pickoff signal; and
   drive electronics coupled to the MEMS gyroscope, the drive electronics computing an average voltage of the pickoff signal to create a direct current threshold level, wherein the drive electronics provide a pulse width modulation drive signal based on the direct current threshold level to the MEMS gyroscope.

2. The system of claim 1, wherein the MEMS gyroscope further comprises a proof mass operable to oscillate along a drive axis in response to the pulse width modulation drive signal.

3. The system of claim 2, wherein the MEMS gyroscope includes proof mass electrodes and drive comb electrodes, and wherein the pulse width modulation drive signal changes a voltage between the proof mass electrodes and the drive comb electrodes.

4. The system of claim 2, wherein a Coriolis acceleration is generated in response to an oscillation of the proof mass and a rotation of the MEMS gyroscope, and wherein the Coriolis acceleration is utilized for measuring the rate of rotation of the MEMS gyroscope.

5. The system of claim 4, wherein the Coriolis acceleration is measured through a change in capacitance between the proof mass and a sense plate.

6. The system of claim 1, wherein the pulse width modulation drive signal is generated from the pickoff signal, which is provided from a motor pickoff comb of the MEMS gyroscope.

7. The system of claim 6, wherein the pickoff signal is demodulated and filtered to create the direct current threshold level.

8. The system of claim 7, wherein the drive electronics further comprises an input signal generator that creates an input signal, and wherein the pulse width modulation drive signal is generated by comparing the direct current threshold level to the input signal.

9. The system of claim 8, wherein a level of the pulse width modulation drive signal changes when the input signal crosses the direct current threshold level.

10. The system of claim 8, wherein the input signal is a periodic waveform.

11. The system of claim 1, wherein the MEMS gyroscope is a tuning fork gyroscope.

12. A method for measuring a rate of rotation of a MEMS gyroscope comprising in combination:
    creating a pulse width modulation signal for use in the MEMS gyroscope by comparing an input signal to a direct current threshold level and changing a level of the pulse width modulation signal when the input signal crosses the direct current threshold level;
    driving a proof mass at a drive velocity with the pulse width modulation drive signal;
    rotating the MEMS gyroscope;
    measuring a change in capacitance between the proof mass and a sense plate;
    calculating a Coriolis acceleration from the change in capacitance between the proof mass and the sense plate; and
    calculating a rate of rotation of the MEMS gyroscope from the Coriolis acceleration and the drive velocity.

13. The method of claim 12 further comprising creating a plurality of pulse width modulation drive signals having different phases.

14. The method of claim 12 further comprising obtaining a pickoff signal from the MEMS gyroscope and creating the direct current threshold level based on the pickoff signal.

15. The method of claim 14 further comprising amplifying at least one of the pickoff signal and the pulse width modulation drive signal.

16. The method of claim 14 further comprising generating the input signal from an input signal generator.

17. The method of claim 14, wherein the input signal is the pickoff signal and wherein the step of comparing comprises comparing the pickoff signal to the direct current threshold level and changing a level of the pulse width modulation signal when the pickoff signal crosses the direct current threshold level.

18. A system for measuring a rate of rotation of a MEMS gyroscope comprising in combination:
   the MEMS gyroscope including a motor pickoff comb that is operable to provide a pickoff signal, and wherein the pickoff signal is utilized for determining a direct current threshold level;
   an input signal unit for generating an input signal; and
   a pulse width modulation drive signal unit for generating a pulse width modulation drive signal based on the input signal and the direct current threshold level,
   wherein the pulse width modulation drive signal is sent to the MEMS gyroscope.

19. The system of claim 18 further comprising a pickoff processing unit operable to amplify, filter, and demodulate the pickoff signal, wherein the pickoff processing unit creates the direct current threshold level.

20. The system of claim 18, wherein the MEMS gyroscope further comprises a motor drive comb, and the pulse width modulation drive signal is sent to the motor drive comb.

21. The system of claim 18, wherein when the input signal is a lower voltage than the direct current threshold level, the pulse width modulation drive signal is set at a low level.

22. The system of claim 21, wherein the low level is substantially zero volts.

23. The system of claim 18, wherein when the input signal has a higher voltage than the direct current threshold level, the pulse width modulation drive signal is set at a high level.

24. The system of claim 23, wherein the high level is substantially five volts.

25. The system of claim 8, wherein when the input signal is a lower voltage than the direct current threshold level, the pulse width modulation drive signal is set at a low level.

26. The system of claim 25, wherein the low level is substantially zero volts.

27. The system of claim 8, wherein when the input signal has a higher voltage than the direct current threshold level, the pulse width modulation drive signal is set at a high level.

28. The system of claim 27, wherein the high level is substantially five volts.

\* \* \* \* \*

UNITED STATES PATENT AND TRADEMARK OFFICE
CERTIFICATE OF CORRECTION

PATENT NO. : 6,718,823 B2  
APPLICATION NO. : 10/137170  
DATED : April 13, 2004  
INVENTOR(S) : William P. Platt Page 1 of 1

It is certified that error appears in the above-identified patent and that said Letters Patent is hereby corrected as shown below:

<u>Title Page: item [75]</u>:  
*Inventor*, "William Platt" should read -- William P. Platt --.

<u>Column 2,</u>  
Line 65, "proof mass electrodes 124, 136," should read -- proof mass electrodes 124, 126, --.

<u>Column 3,</u>  
Line 52, delete "and".

<u>Column 5,</u>  
Line 57, "unit 270" should read -- unit 260 --.

Signed and Sealed this

Fifth Day of June, 2007

JON W. DUDAS  
*Director of the United States Patent and Trademark Office*